United States Patent
Hengge et al.

(10) Patent No.: US 11,682,939 B2
(45) Date of Patent: Jun. 20, 2023

(54) METHOD FOR PRODUCING SLOT INSULATORS FOR WINDING SLOTS OF A COMPONENT OF AN ELECTRICAL MACHINE

(71) Applicant: GROB-WERKE GMBH & CO. KG, Mindelheim (DE)

(72) Inventors: Manfred Hengge, Leutkirch (DE); Steffen Pohl, Pfaffenhausen (DE)

(73) Assignee: GROB-WERKE GMBH & CO. KG, Mindelheim (DE)

( * ) Notice: Subject to any disclaimer, the term of this patent is extended or adjusted under 35 U.S.C. 154(b) by 197 days.

(21) Appl. No.: 16/770,988

(22) PCT Filed: Dec. 3, 2018

(86) PCT No.: PCT/DE2018/100984
§ 371 (c)(1),
(2) Date: Jun. 9, 2020

(87) PCT Pub. No.: WO2019/114870
PCT Pub. Date: Jun. 20, 2019

(65) Prior Publication Data
US 2020/0336034 A1   Oct. 22, 2020

(30) Foreign Application Priority Data
Dec. 11, 2017 (DE) .......................... 102017129474.0

(51) Int. Cl.
*H02K 15/10* (2006.01)
*H02K 15/08* (2006.01)
(Continued)

(52) U.S. Cl.
CPC ............... *H02K 3/345* (2013.01); *H02K 1/04* (2013.01); *H02K 3/30* (2013.01); *H02K 15/08* (2013.01); *H02K 15/10* (2013.01)

(58) Field of Classification Search
CPC .......... H02K 3/345; H02K 3/30; H02K 15/08; H02K 15/10
See application file for complete search history.

(56) References Cited

U.S. PATENT DOCUMENTS 2,111,457 A * 3/1938 McCaffrey ............. H02K 15/10
29/760
3,519,862 A   7/1970 Walker
(Continued)

FOREIGN PATENT DOCUMENTS

CN   101027826 A   8/2007
CN   101841215 A   9/2010
(Continued)

OTHER PUBLICATIONS

International Search Report; priority document.
(Continued)

*Primary Examiner* — Peter Dungba Vo
*Assistant Examiner* — Jose K Abraham
(74) *Attorney, Agent, or Firm* — Greer, Burns & Crain, Ltd.

(57) ABSTRACT

To reduce the time for producing slot insulators, a method for producing slot insulators for winding slots of a component of an electrical machine, includes supplying a strip of insulating material, cutting off an insulator strip portion from the strip, molding the insulator strip portion for adjustment to the mold of the winding slot, and inserting the molded insulator strip portion into the winding slot, wherein at least the molding and inserting steps are carried out in parallel for at least two insulator strip portions to be inserted into different winding slots. Moreover, a device for carrying out the method is described.

9 Claims, 5 Drawing Sheets

(51) Int. Cl.
*H02K 3/34* (2006.01)
*H02K 1/04* (2006.01)
*H02K 3/30* (2006.01)

(56) References Cited

U.S. PATENT DOCUMENTS

| | | | |
|---|---|---|---|
| 3,579,818 A | 5/1971 | Arnold et al. | |
| 3,742,596 A | 7/1973 | Smith et al. | |
| 3,926,421 A | 12/1975 | Reiger, Jr. et al. | |
| 4,136,433 A * | 1/1979 | Copeland | H02K 15/10 29/33 L |
| 4,449,289 A * | 5/1984 | Kindig | H02K 15/10 29/736 |
| 4,658,492 A * | 4/1987 | Kieffer | H02K 15/068 29/564.6 |
| 4,692,972 A * | 9/1987 | Schultes | H02K 15/10 29/33 L |
| 4,748,732 A | 6/1988 | Schultes | |
| 4,878,292 A * | 11/1989 | Santandrea | H02K 15/10 29/33 L |
| 6,154,950 A * | 12/2000 | Katahira | H02K 15/10 29/598 |
| 6,203,739 B1 * | 3/2001 | Hazelton | H02K 15/10 264/285 |
| 6,282,773 B1 | 9/2001 | Luttrell | |
| 6,564,444 B1 * | 5/2003 | Ponzio | H02K 15/10 29/709 |
| 6,618,928 B1 | 9/2003 | DeHart | |
| 8,627,868 B2 | 1/2014 | Guercioni | |
| 2002/0038505 A1 * | 4/2002 | Luttrell | H02K 15/10 29/564.6 |
| 2002/0124381 A1 * | 9/2002 | Stratico | H02K 23/04 29/596 |
| 2005/0005423 A1 * | 1/2005 | Stratico | H02K 15/10 29/596 |
| 2010/0264757 A1 * | 10/2010 | Asou | H02K 3/38 310/43 |
| 2012/0117790 A1 * | 5/2012 | Carpentier | H02K 15/066 29/734 |
| 2017/0047803 A1 | 2/2017 | Scherer et al. | |
| 2020/0336034 A1 * | 10/2020 | Hengge | H02K 3/30 |

FOREIGN PATENT DOCUMENTS

| | | |
|---|---|---|
| CN | 102792561 A | 11/2012 |
| CN | 203219047 U | 9/2013 |
| CN | 103683754 A | 3/2014 |
| CN | 104184263 A | 12/2014 |
| CN | 106300754 A | 1/2017 |
| DE | 31079 A1 | 1/1962 |
| DE | 65416 A1 | 12/1967 |
| DE | 1939928 A | 5/1970 |
| EP | 0174513 A1 | 3/1986 |
| EP | 0938183 A1 | 8/1999 |
| JP | 2002291209 A | 10/2002 |

OTHER PUBLICATIONS

German Search Report; priority document.
Chinese Office Action and Search Report for corresponding Chinese Patent Application No. 201880079723.1 dated Nov. 29, 2021; and English Translation.
European Office Action for corresponding European Patent Application No. 18826927.8 dated Aug. 9, 2021.

* cited by examiner

METHOD FOR PRODUCING SLOT INSULATORS FOR WINDING SLOTS OF A COMPONENT OF AN ELECTRICAL MACHINE

CROSS-REFERENCES TO RELATED APPLICATIONS

This application claims the benefit of the International Application No. PCT/DE2018/100984, filed on Dec. 3, 2018, and of the German patent application No. 102017129474.0 filed on Dec. 11, 2017, the entire disclosures of which are incorporated herein by way of reference.

FIELD OF THE INVENTION

The invention relates to a method for producing slot insulators for winding slots of a component of an electrical machine. The invention further relates to a device for producing slot insulators for winding slots of a component of an electrical machine.

With respect to the technological background of the invention, reference is made to the following source:

| [1] | U.S. Pat. No. 6,282,773 B1 |
| [2] | EP 0 174 513 A1 |

The present invention is in the field of the production of electric motors or other electrical machines, such as generators, for example, which are designed for high performance, reliable operation and high efficiency. In particular, electric motors are to be produced that can be used as driving engines of electric vehicles or hybrid vehicles and have a nominal output of between 20 kW and 400 kW, for example. In order to build stators of such high-performance electrical machines, it is advantageous to provide as high a coil density as possible. In this regard, it is known to provide coil windings that can be fitted into radially open slots of a holding body, such as, in particular, the main body of a stator or rotor. In order to achieve a particularly high filling level, the coil windings are made from, in particular, wires with a rectangular cross section.

In order to electrically insulate the individual coil windings, each of the slots is provided with a slot insulation.

There are various methods for producing the geometry of the slot insulation. The goal is to insert an adjustable geometry within a short cycle time. In particular, the following variants are used, which are both addressed in the source [1]:

1) Slot insulation from the broad-width reel, and
2) Slot insulation from the narrow-width reel In the broad-width reel variant, a strip of insulating paper is cut off from a stock reel. Then, the entire geometry is embossed in a single cycle. The width of the reel ultimately also determines the length of the insulation.

Advantages:
Comparatively short cycle times can be realized
Low installation space requirements
Inexpensive system
Disadvantages:
Low flexibility—An adjustment of the slot insulation length requires a conversion of the system to a stock reel with a changed width A method according to variant 2) is extensively described in source [1]. In this case, paper is reeled off as an insulation, then cut; a collar is embossed and turned over, the insulating paper is then embossed and discharged into the stator.

The advantages of this method are:
Changing the slot insulation length possible during the process, even with a batch quantity=1
The disadvantages are:
Long cycle times
Large installation space requirements
Expensive system Source [2] discloses a method and a device for isolating slots of a stator or a rotor of an electrical machine, wherein a length for two isolating strip portions is cut from a strip of isolating material, both isolating strip portions are molded simultaneously and then are inserted simultaneously into slots of the stator or rotor.

SUMMARY OF THE INVENTION

The invention has set itself an object of providing a method and a device for producing slot insulators for winding slots of a component of an electrical machine with which shorter cycle times can be achieved.

Preferably, a smaller installation space and more cost-effective structure are to be obtainable.

Preferably, an, if possible, optimum insulation is supposed to be flexibly adjustable within the process.

The invention, according to one aspect thereof, relates to a method for producing slot insulators for winding slots of a component of an electrical machine, comprising a) supplying a strip of insulating material,
c) cutting off an insulator strip portion from the strip,
d) molding the insulator strip portion for adjustment to the shape of the winding slot, and
e) inserting the molded insulator strip portion into the winding slot, wherein at least the steps d) and e) are carried out in parallel for at least two insulator strip portions to be inserted into different winding slots.

Preferably, the steps c), d) and e) are carried out in parallel for at least three insulator strip portions to be respectively inserted into different winding slots.

A preferred embodiment of the method comprises the steps molding the insulator strip portion in one of several molds, and guiding the several molds on a circulating path containing at least one pick-up station for picking up the insulator strip portion and a delivery station for inserting the molded insulator strip portion into the winding slot.

A preferred embodiment of the method comprises:
Using at least one first, one second and one third mold, which are moved in a cyclical manner on the circulating path at least from the pick-up station to a molding station, from the molding station to the delivery station, and from the delivery station to the pick-up station.

A preferred embodiment of the method comprises:
Using a fourth mold, wherein the first through fourth molds are moved in a cyclical manner between the stations on the circulating path, wherein the stations additionally comprise a positioning station between the pick-up station and the molding station.

Preferably, the cutting-off process takes place at the pick-up station.

Preferably, molds with a first and a second mold part are used, and the first and the second mold part, in order to change the shape of the insulator strip portion, are moved relative to each other at at least one of the stations on the circulating path.

Preferably, the production takes place in processing cycles, wherein two, three, four or more processing cycles are carried out in parallel, wherein the processing cycles are selected from a group of processing cycles including:

molding at least one longitudinal edge or several longitudinal edges of the strip or of the insulator strip portion;

cutting off the insulator strip portion and/or turning back a collar on a front edge of the strip and/or on a rear edge of the insulator strip portion;

positioning the insulator strip portion in the mold;

embossing the insulator strip portion by means of an embossing stamp in the mold in order to mold the slot insulator, and pushing the molded insulator strip portion from the mold into the winding slot.

Preferably, the method includes the step:

b) molding at least one longitudinal edge region of the strip or of the insulator strip portion.

Preferably, step c) includes: selecting the insulator strip portion length, which extends in the moving direction of the strip, of the insulator strip portion to be cut off, depending on the axial length of the winding slot; and step e) includes: inserting the molded insulator strip portion in an inserting direction extending in the direction of the insulator strip portion length.

According to another aspect, the invention provides a device for producing slot insulators for winding slots of a component of an electrical machine, comprising:

a supply device for supplying a strip of insulating material, a cutting device for cutting off an insulator strip portion from the strip, a molding device for molding the insulator strip portion;

an inserting device for inserting the molded insulator strip portion into the winding slot, and a transport device with several holding members for holding at least one insulator strip portion each, wherein the holding members are movable on a circulating path with several stations for the simultaneous processing of several insulator strip portions.

Preferably, the transport device has, as holding members, several molds of the molding device.

Preferably, the transport device includes a tool turret or is configured as such.

Preferably, the transport device is configured for moving the holding members from a pick-up station for picking up an insulating strip portion cut off by the cutting device to a molding station for molding the insulating strip portion by means of the molding device, from the molding station to a delivery station for inserting the molded insulating strip portion into the winding slot, and from the delivery station to the pick-up station.

Preferably, the transport device is configured for moving the holding members from a pick-up station for picking up an insulating strip portion cut off by the cutting device to a positioning station for positioning the insulating strip portion in a mold of the molding device, from the positioning station with the mold to a molding station for molding the insulating strip portion by means of the molding device, from the molding station to a delivery station for inserting the molded insulating strip portion into the winding slot, and from the delivery station to the pick-up station.

Preferably, the transport device is configured for moving a first holding member from a first station to a second station on the circulating path and, simultaneously therewith, to move a second holding member from the second station to the first or to another station.

Preferably, the transport device has a first, a second and a third holding member for simultaneously processing at least three insulating strip portions on a first through third station.

Preferably, the transport device has a first, a second, a third and a fourth holding member for simultaneously processing at least four insulating strip portions on a first through fourth station.

Preferably, the cutting device has a collar turning device for turning back a front edge of the strip and/or a rear edge of the cut-off strip portion.

Preferably, the molding device has a molding member or an embossing stamp at a molding station.

Preferably, an edge raising device for raising at least one longitudinal edge of the strip and/or of the insulating strip portion is provided.

Preferably, the cutting device is configured for cutting off the insulating strip portion with an insulating strip portion length dependent upon the length of the winding slot to be insulated.

Preferably, the inserting device is configured for inserting the molded insulating strip portion in an inserting direction oriented in the direction of the insulating strip portion length.

Preferably, each holding member has a first holding sub-member and a second holding sub-member, wherein the holding sub-members can be moved relative to each other.

Preferably, each holding member is movably mounted on the transport device.

Preferably, a holding member drive device for driving the relative movement of the holding sub-members or the movement of the holding member is provided.

Preferably, the holding member drive device is configured for driving the relative movement or movement at one and/or upstream of one or more of the stations. As a result, the holding member can be moved in a driven manner by means of the holding member drive device at this and/or, for example, in the course of the movement towards, this station. In particular, the first and the second holding member sub-member can be moved relative to each other by means of the holding member drive device when the holding member is located at the and/or on the way to the respective station.

The holding member drive device is preferably an element from the group of drive devices including an active individual drive, a separate individual drive, an actuator, a link motion, a stationary link and a link follower member and a mechanical linkage for linking the holding member movement or holding sub-member relative movement with the movement of the transport device.

In particularly preferred embodiments of the device, and also in preferred embodiments of the method that can be carried out by means of these embodiments of the device, the holding members can be moved in a separately driven manner what is meant here is not, for example, a rotation of the transport device configured as a turret, for example, but a drive unit for a holding member's own movement, particularly in the fourth cycle in which two halves may be folded together, for example, so that the insulation acquires the final shape. However, the drive unit for the holding member's own movement need not be limited to folding process in cycle four—in other embodiments, the other holding members may also carry out any own movements.

In preferred embodiments, the driving of the own movement of one or optionally also several holding members may either (i) take place by means of an active and separate individual drive or (ii) be caused by a link motion (e.g., a stationary link) or a mechanical linkage, due to the rotary movement of the turret.

Some advantages and properties of preferred embodiments of the invention are explained in more detail below.

In the above-mentioned procedure 1), reeling off from the broad-width reel, steps can be saved in comparison to the procedure 2). The length of the insulation in the case of the broad-width reel is, however, predetermined by the width of the stock reel. In this case, no adjustment is possible during the process. Therefore, preferred embodiments of the invention relate to a reeling-off process from the narrow-width roll and operate according to the procedure 2).

In order to accelerate the cycle times particularly, but not exclusively, in the case of the procedure 2) with the narrow-width roll, one idea on which the invention is based is to decouple the individual steps and carry them out in parallel.

Preferred embodiments of the invention relate to a variant of the reeling-off process from the narrow-width roll. In the narrow-width roll variant, the insulating strip material, e.g., paper, is reeled off from a stock reel (step 1). Preferably, the material, e.g., continuous paper, is provided with four continuous beads, for example by means of bead rolls or the like (step 2). In a preferred embodiment, legs are bent up at the bead on the long side (step 3).

Preferably, the length of the slot insulation is individually cut to length during cutting (step 4) (even at a batch quantity=1), and the collar is embossed at the same time (step 5).

Furthermore, preferred embodiments of the method include the steps of turning back the collar (step 6), embossing the insulation or back (step 7), folding (step 8) and discharging into the stator (step 9).

In a particularly preferred embodiment, steps 4 to 9 take place simultaneously in four cycles running in parallel, due to being decoupled as regards time and arranged in parallel. The cycle time is thus reduced enormously. The number of drive units can thus be significantly reduced, which also increases process reliability.

BRIEF DESCRIPTION OF THE DRAWINGS

An exemplary embodiment will be explained in more detail below with reference to the attached drawings. In the drawings.

DETAILED DESCRIPTION OF THE PREFERRED EMBODIMENTS

Different embodiments for a method and a device 20 for producing slot insulators 138 for winding slots 14 of a component 16 of an electrical machine will be explained in more detail below, with reference to the attached drawings.

Figure 11:
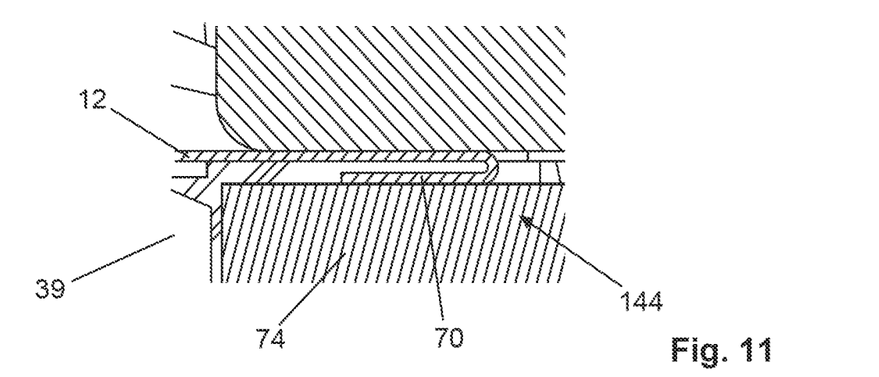
FIG. 11 shows a plan view of a partial region of the section of FIG. 10 for the additional illustration of the sixth step.
Figure 12:
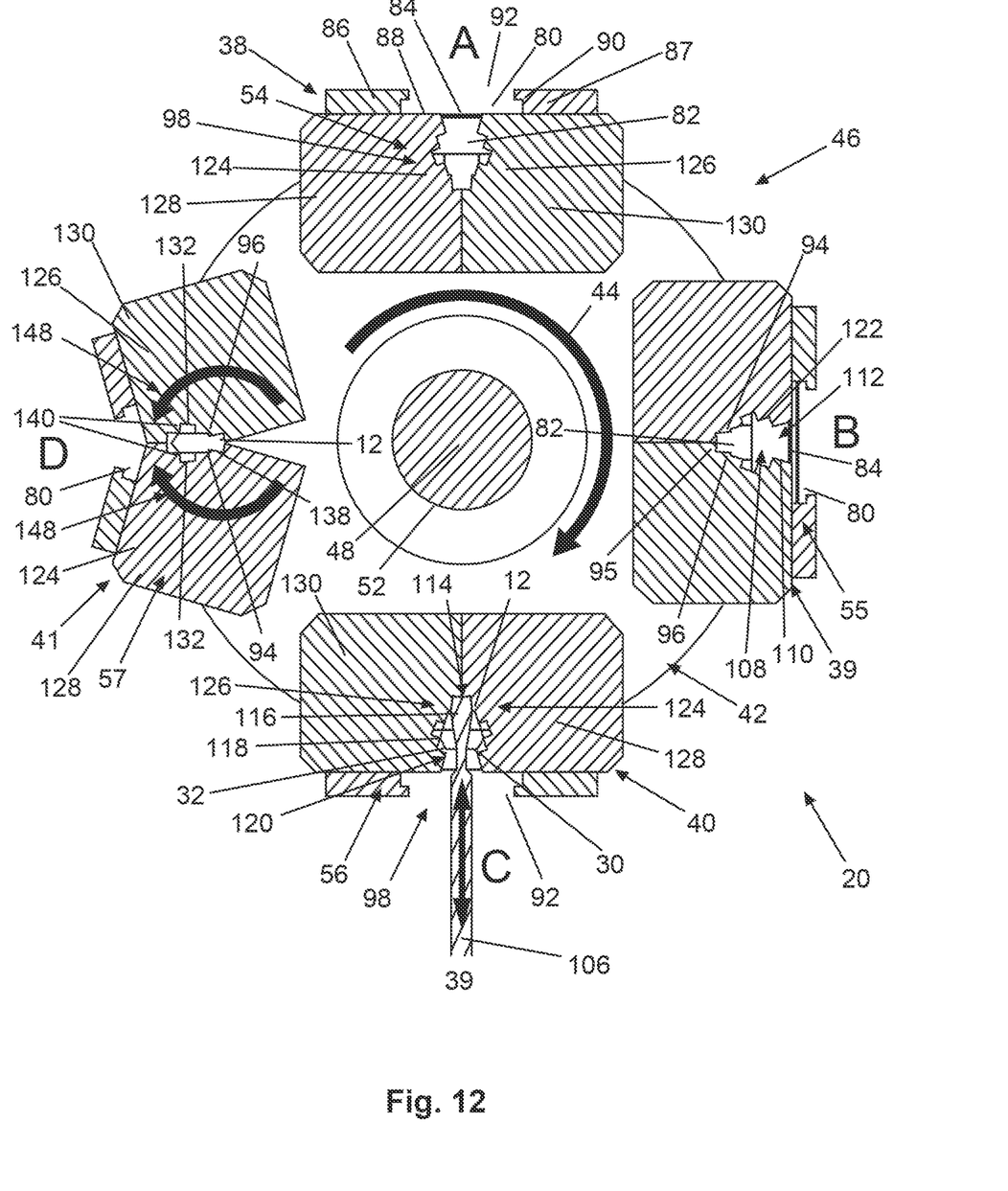
FIG. 12 shows a cross-sectional view through an embodiment of the device shown in FIG. 8, through a transport device of the device, wherein a first and a fourth station of the device with a first through fourth holding member are depicted in a section transverse to an axis of rotation of the transport device.
Figure 13:
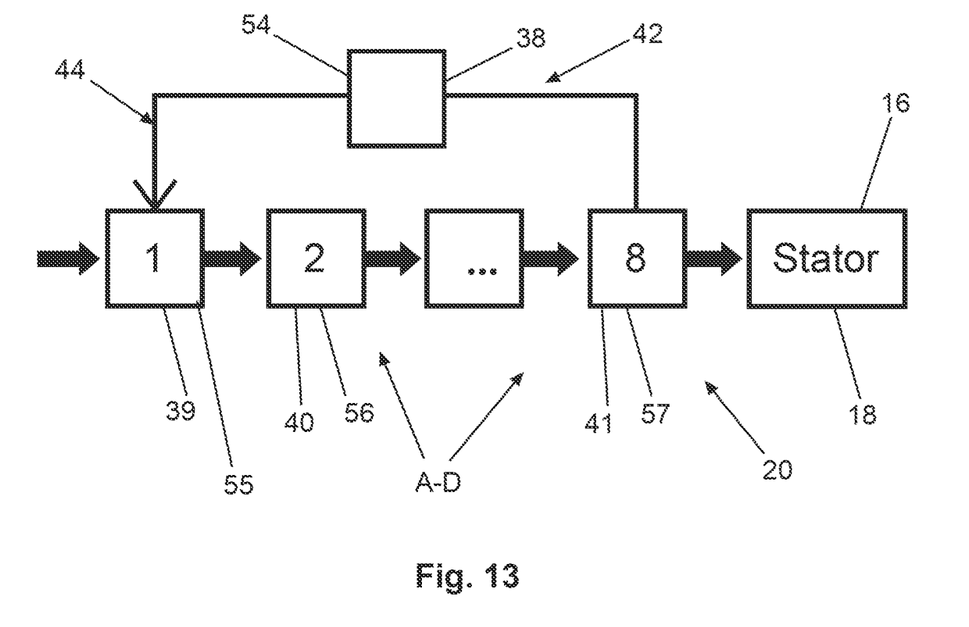
FIG. 13 shows a block diagram of another embodiment of the method.

Here, molding steps are shown in FIGS. 1 to 7 during the molding of the slot insulator 138 from a strip 10 of insulating material, preferred embodiments for the device 20 for carrying out the method are schematically shown in FIGS. 8 to 12, and a block diagram for a variant of the device 20 is presented in FIG. 13.

In the method, first, a strip 10 of an electrically insulating material is supplied. The strip 10 is shown, for example, in FIGS. 1 and 2 and in FIG. 8.

The method further comprises the step of cutting off an insulator strip portion 12 from the strip 10. The insulator strip portion 12 is shown, for example, in FIGS. 3 to 7.

Figure 5:
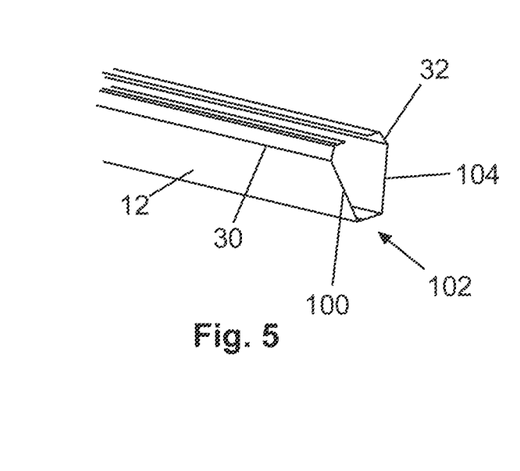
FIG. 5 shows a perspective view of the insulator strip portion after a seventh step of the method.
Figure 6:
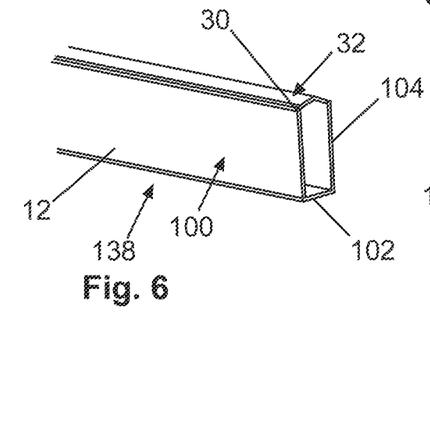
FIG. 6 shows a perspective view of the insulator strip portion after an eighth step of the method.

In the method, the insulator strip portion 12 is moreover molded for adjustment to the shape of the winding slot 14, as is shown in FIGS. 5 and 6, for example.

Figure 7:
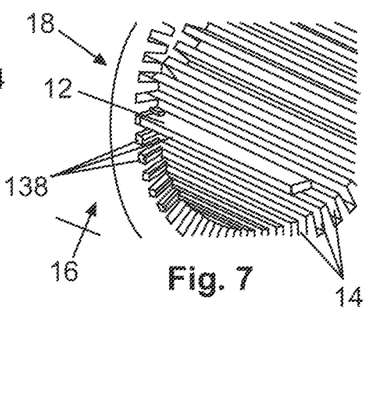
FIG. 7 shows a perspective view of the insulator strip portion and a component of an electrical machine with winding slots for illustrating a ninth step of the method.

Then, the insulator strip portion 12 molded in this manner is inserted, as is shown in FIG. 7, for example, into the winding slot 14 of the component 16 of an electrical machine. In particular, the component 16 is a stator 18 of an electrical machine, such as an electric motor to be used for electromobility.

In order to reduce the cycle times and the installation space of the device 20, at least the steps of molding the insulator strip portion 12 and of inserting the molded insulator strip portion 12 are carried out in parallel for at least two insulator strip portions 12 to be inserted into different winding slots 14. In particular, a first insulator strip portion 12 is molded at a station of the device 20, while a previously molded further insulator strip portion 12 is simultaneously inserted into the winding slot 14 in another station of the device 20.

A preferred embodiment of the method and a preferred embodiment of the device 20 will be described below with reference to the attached FIGS. 1 to 12.

In this respect, various possible steps of the method and the shape of the insulator strip portion 12 resulting from these steps will first be explained in more detail with reference to FIGS. 1 to 7.

A preferred embodiment of the method includes the following steps:

First step 1: Supplying a strip of insulating material, preferably by reeling off a paper from a stock reel 22 configured as a narrow-width reel;

Second step 2: Introducing a first through fourth continuous bead by means of bead rolls 24;

Third step 3: Bending legs 30, 32 on the long sides at the bead;

Fourth step 4: Cutting off the insulator strip portion 12 from the strip 10; preferably in such way that the length of the slot insulation is cut off to individually match the length of the winding slot 14;

Fifth step 5: Embossing a collar 70;

Sixth step 6: Turning back the collar 70;

Seventh step 7: Embossing the insulator strip portion 12, particularly a back 102 thereof Eighth step 8: Folding the insulator strip portion 12;

Ninth step 9: Discharging the molded insulator strip portion 12 into the stator 18.

As is apparent from FIGS. 8 to 12, a preferred embodiment of the device 20 comprises a supply device 58 for supplying a strip 10 of insulating material, a cutting device 60 for cutting off the insulator strip portion 12 from the strip 10, a molding device 98 for molding the insulator strip portion 12, an inserting device 140 for inserting the molded insulator strip portion 12 into the winding slot 14, and a transport device 42 with several holding members 38-41 for holding at least one insulator strip portion 12 each, wherein the holding members 38-41 are movable on a circulating path 44 with several stations A-D for the simultaneous processing of several insulator strip portions 12.

In a preferred embodiment, the device 20 has, as holding members 38-41, several molds 54-57 of the molding device 98.

The first station A is configured, for example, as a pick-up station for picking up an insulating strip portion 12 cut off by the cutting device 60. Preferably, the cutting device 60 is also formed on the first station A. Preferably, a collar 70 is also embossed at the first station.

The second station B is configured, for example, as a positioning station for positioning the insulator strip portion 12 in the mold 55 of the molding device 98 located at this second station B. Preferably, the collar 70 is also folded back at this second station B.

A third station C is preferably configured as molding station for molding the insulating strip portion 12 by means of the molding device 98.

A fourth station D is preferably configured as a delivery station for inserting the finished slot insulator 138 into the winding slot 14. In particular, the inserting device 140 is formed on the fourth station.

Due to the four-station configuration, the device 20 is capable of carrying out the processing of the insulator strip portion 12 in four cycles, so that at least four insulator strip portions 12 can be processed simultaneously because of the parallel execution of the four cycles at different stations.

Details of preferred embodiments of the method and of the device will explained in more detail below with reference to the Figures.

Figure 8:
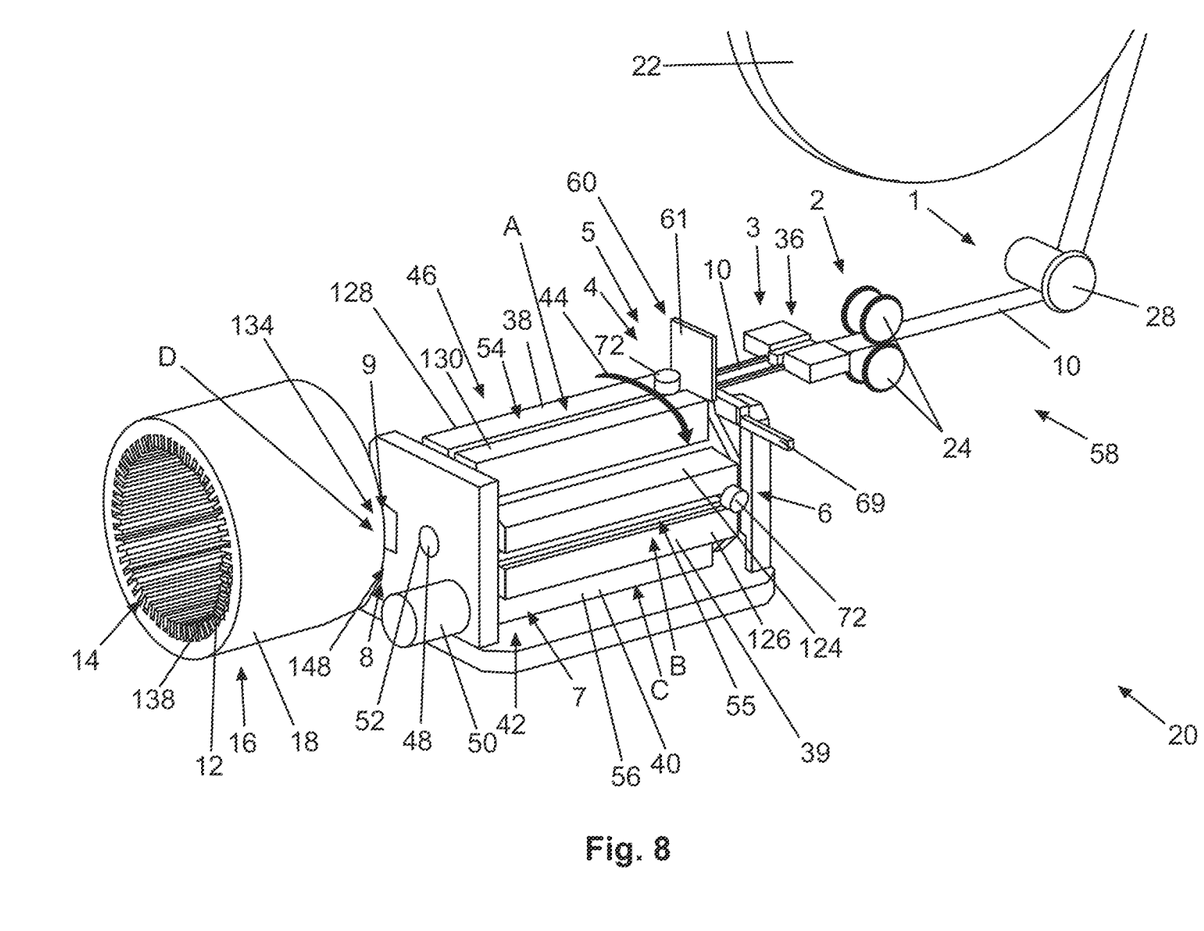
FIG. 8 shows a schematic perspective overview of a device for producing slot insulators for winding slots of a component of an electrical machine and for carrying out the method, whose individual steps are shown in FIGS. 1 to 7.

As shown in FIG. 8, a possible embodiment of the supply device 58 has a stock reel 22 and at least one feeding member, such as a deflector and smoothing roll 28, for example. When the first step 1 is carried out, the stock reel 22, in this case configured as a narrow-width reel, is first supplied, as is apparent from FIGS. 1 and 8. From it, a strip 10 of insulating material is reeled off via the deflector and smoothing roll 28, e.g., driven by driving the deflector and smoothing roll 28 and driving bead rolls 24.

Figure 1:
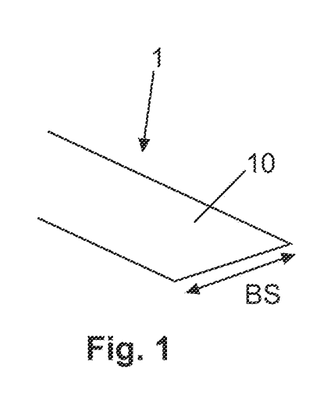
FIG. 1 shows a perspective view of an insulating material strip for illustrating the first step of a method for producing slot insulators for winding slots of a component of an electrical machine.

Upstream of the bead rolls 24 shown in FIG. 8, the strip 10 has the flat shape shown in FIG. 1. A strip 10 of electrically insulating material, particularly paper material, e.g., coated with plastic material, is supplied by the supply device 58.

In accordance with the width and depth of the winding slot 14, the width BS of the strip 10 is selected in such a way that the inner surface of the winding slot 14 can be covered, and that additionally, a first leg 30 on the one long side and a second leg 32 on the other long side can cover the open side of the winding slot 14.

A first through fourth bead 34 is introduced at the bead rolls 24 shown in FIG. 8. Then, the legs 30, 32 are bent upwards in a leg bending device 36 formed by several molding blocks. The leg bending device 36 is an exemplary embodiment for an edge raising device for raising edges of the insulator strip portion 12.

The device 20 has several holding members 38-41 which can be cyclically moved on the circulating path 44 with several stations A-D by means of the transport device 42.

In the exemplary embodiment shown, the device 20 has a first holding member 38, a second holding member 39, a third holding member 40 and a fourth holding member 41, which can be transported by means of the transport device 42 from the first station A to the second station B, then to the third station C, and to the fourth station D. In FIGS. 8 to 12, for instance, the first holding member 38 is located at the first station A, the second holding member 39 at the second station B, the third holding member 40 at the third station C, and the fourth holding member 41 at the fourth station D. In the next cycle, the holding members 38 are transported by the transport device 42 to the respective next station so that the first holding member 38 is located at the second station B, the second holding member 39 at the third station C, the third holding member 40 at the fourth station D, and the fourth holding member 41 at the first station A.

In the embodiment of the device 20 shown in FIGS. 8 to 12, the transport device 42 is configured as a tool turret 46. The tool turret 46 can be rotated about an axis of rotation 48 by means of a rotary drive 50 in order to bring the holding members 38-41 to the respective next station A-D. For this purpose, the holding members 38-41 are supported on cantilevers, which are not shown in any more detail, of a rotary shaft 52 of the tool turret 46.

As can best be seen from FIG. 12, the holding members 38-41 are configured as mutually identical molds 54-57 in each case, or have such a mold 54-57. The shape and configuration of the mold 54-57 will be addressed below.

Figure 9:
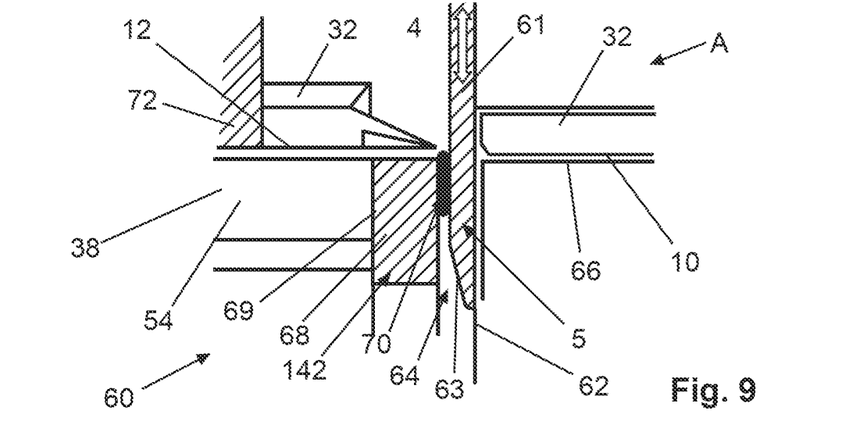
FIG. 9 shows a sectional view of a partial region of the device with a holding member located at a first station within the context of the fourth and fifth steps of the method being carried out.

FIG. 9 shows a cross section through an infeed region on the first holding member 38 at the first station A.

As is apparent from FIGS. 8 and 9, the strip 10 provided with the legs 30, 32 is introduced into the holding member located at the first station A—in this case the first holding member 38.

Figure 2:
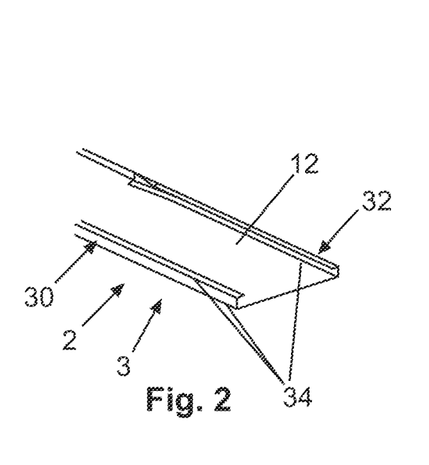
FIG. 2 shows a perspective view of the insulating material strip after a second and a third step of the method have been carried out.

Accordingly, the stock reel 22, the deflector and smoothing roll 28, the bead rolls 24 and the leg bending device 36 form elements of the supply device 58 for supplying the strip 10 of insulating material, which is shown in FIGS. 1 and 2, at the first station A.

The first station A is provided with the cutting device 60 for cutting off the insulator strip portion 12 from the strip 10, and with a collar embossing device 142 for embossing the collar 70, which are explained in more detail below.

As is apparent from FIGS. 8 and 9, the cutting device 60 has a cutting blade 61, which can be displaced in a driven manner, by means of which the insulator strip portions 12 inserted into the first holding member 38 are cut off from the remaining strip 10. The cutting blade 61 has a cutting edge 62 followed by an inclined portion 63. The cutting edge 62 is formed at the side of the cutting blade 61 distant from the holding member 38; and the inclined portion 63, viewed from the cutting blade 61, extends in the displacement direction of the cutting blade 61 towards the holding member 38. The cutting blade 61 is introduced into a gap 64 between an inlet guide 66 and a cutting block 68. The insulating strip portion 12 is cut off directly at the inlet guide 66 by the cutting edge 62 that is farther distant from the cutting block 68, wherein the end portion of the cut-off insulating strip portion 12, which extends across the gap 64, is guided by the inclined portion 63 around an edge of the cutting block 68, thus forming a collar 70, which is embossed at the edge of the cutting block 68.

Particularly preferably, the cutting block 68 is configured as a part of a first slide 69 which, e.g., after the introduction of the insulator strip portion 12 into the first holding member 38, is moved in into its cutting position in order to then carry out, with a moved-in first slide 69, the cutting process (fourth step 4) and the process of embossing the collar 70 (fifth step 5). After the fourth step 4 and the fifth step 5 have been carried out, the first slide 69 is again moved out, whereupon the holding members 38-41 may be transported to the respective next station A-D.

Moreover, a retaining stamp 72 is indicated in FIGS. 9 and 8 which, at the first station A, can be moved radially towards the holding member 38 in order to retain the insulator strip portion 12 for the cutting-off process, and which can be retracted again in order to enable, in the next cycle, the movement of the first holding member 38 with the insulator strip portion 12 to the next station B and, at the trailing fourth holding member 41, the introduction of the strip 10.

Figure 3:
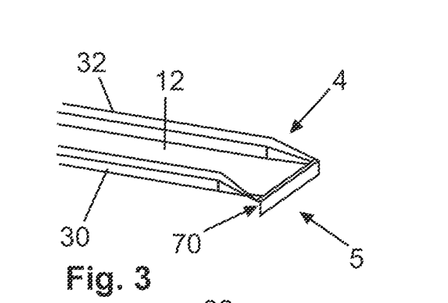
FIG. 3 shows a perspective view of an insulator strip portion cut off from the insulating material strip after a fourth and a fifth step of the method have been carried out.

Thus, the fourth step 4 and the fifth step 5 are carried out at the first station A, and the shape of the insulator strip portion 12 shown in FIG. 3 is produced.

At the same time as the first insulator strip portion 12 is processed at the first station A, a second insulator strip portion 12 which, in a previous working cycle, has been cut off correspondingly at the first station A with the collar 70 having been embossed accordingly, is processed further at the second station B.

Figure 4:
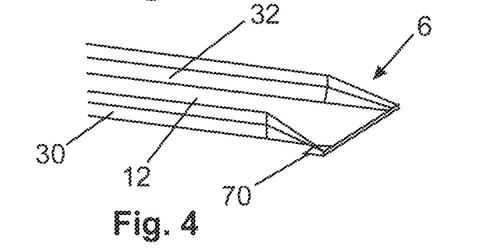
FIG. 4 shows a perspective view of the insulator strip portion after a sixth step of the method.
Figure 10:
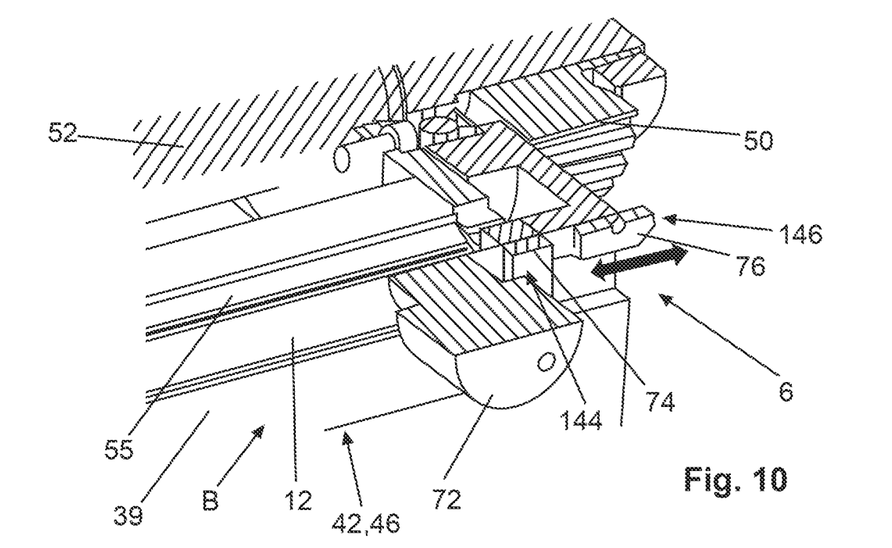
FIG. 10 shows a horizontal sectional view of a partial region of the device according to an embodiment thereof, with a holding member located at a second station for holding the insulator strip portion, within the context of the sixth step of the method being carried out.

At the second station B, as will now be explained in more detail with reference to FIGS. 10, 11 and 4, the collar 70 is bent back (sixth step 6) and the insulator strip portion with the turned-back collar 70 is positioned into the second holding member 39 configured as a second mold 55. For this purpose, a collar turning device 144 and a positioning device 146, which will be explained in more detail below, are formed on the second station B.

Also, a retaining stamp 72, which acts in a manner comparable to the retaining stamp 72 at the first station A and fixes in the second holding member 39 the second insulator strip portion 12, which still protrudes with its end portion over the second holding member 39, is formed at the second station B. The collar turning device 144 has a second slide 74 on the second station B, which can be moved in the axial direction towards the second holding member 39 in order to bend the collar 70 back in the manner shown in FIG. 11. Then, the retaining stamp 72 at the second station B is retracted and the second insulator strip portion 12 is fully pushed into the second holding member 39 by a third slide 76—an example for the positioning device 146. The shape of the insulating strip portion 12 resulting after the processing at the second station B is shown in FIG. 4.

At the same time as the first insulator strip portion 12 is cut at the first station A and the collar 70 on the second insulator strip portion 12 is turned back at the second station B, a third insulator strip portion 12, which is held in a third holding member 40 located at the third station C, is molded at the third station C by means of the molding device 98. This third insulator strip portion 12 has been processed in a previous cycle at the second station B. The configuration of the molding device 98 is explained in more detail with reference to FIG. 12.

FIG. 12 shows the simultaneous arrangement of the holding members 38-41 at the different stations A-D. Moreover, FIG. 12 shows the cross section through the holding members 38-41, each of which acts as a mold 54-57.

As is apparent from FIG. 12, the holding members 38-41 have substantially identical configurations. They each include a first accommodating portion 80 for accommodating the insulator strip portion 12 and a second accommodating portion 82 for accommodating and molding the insulator strip portion 12. The first accommodating portion 80 is configured to be wider than the second accommodating portion 82. The second accommodating portion 82 is located radially inwards of the first accommodating portion 80 and, with its gap-shaped opening 84, opens into the bottom of the first accommodating portion 80.

In a preferred embodiment, the first accommodating portion 80 has a first lateral limiting member 86 and a second lateral limiting member 87 and a bottom surface 88 at the bottom, against which the retaining stamps 72 can clamp the insulator strip portion 12. In the center, the bottom surface 88 has the gap-shaped opening 84.

Preferably, the first accommodating portion 80 is configured with a substantially rectangular cross section, wherein a groove or undercut 90 is formed at the side surfaces in the lateral limiting members 86, 87. An opening 92, through which the respective retaining stamp 72 can reach, is provided opposite the bottom surface 88 and between the lateral limiting members 86, 87. In the illustrated embodiment, this opening 92 is configured as a longitudinal opening extending across the entire length of the holding member 38-41.

The second accommodating portion 82 is configured for molding the insulator strip portion 12. It has several molding surfaces 94, 95, 96 forming negative molds for outer surfaces of the insulator strip portion 12. The shape and arrangement of the molding surfaces 94, 95, 96 are selected in accordance with the shape and arrangement of the side walls of the winding slots 14 to be insulated.

The third station C is configured as molding station for molding the insulating strip portion 12. At this molding station C, the insulating strip portion 12, which here is located on the third holding member 40, is molded by the molding device 98. The molding device 98 includes the molds 54-57 as well as an embossing stamp 106 acting as a molding member. The embossing stamp 106 is displaceably mounted on the third station C, so that it is capable of moving radially into the second accommodating portion 82 and of being moved out again.

A first molding surface 94 for forming a first side wall 100, a second molding surface 95 for forming a back 102 and a third molding surface 96 for forming a second side wall 104 are provided as molding surfaces 94-96.

The embossing stamp 106 is configured, when pushed into the second accommodating portion 82, for pushing the third insulating strip portion 12 from the first accommodating portion 80 through the gap-shaped opening 84 into the second accommodating portion 82.

Preferably, the embossing stamp 106 is also configured for pressing the third insulator strip portion 12, subsequent to it being pushed through the opening 84, against the second molding surface 95, wherein the transition between the back 102 and the side walls 100, 104 is embossed at the edges of the free end of the embossing stamp and at the transitions between the first molding surface 94 and the second molding surface 95 as well as between the second molding surface 95 and the third molding surface 96.

Between a molding zone 108, which is delimited by the molding surfaces 94, 95, 96, and the gap-shaped opening 84, the second accommodating portion 82 has transition surfaces 110 that conically taper in the direction towards the axis of rotation 48. Thus, the transition between the first accommodating portion 80 and the molding zone 108 has a funnel-shaped configuration, so that the insertion of the insulating strip portion 12 through the gap-shaped opening 84 is facilitated.

Preferably, the molding zone 108 widens again behind the transition surfaces 110, so that the molding zone 108 has a greater width than the conical transition zone 112 delimited by the transition surfaces 110.

The molding surfaces 94, 96 forming the side walls 100, 104 are configured to be oblique to such an extent, at the third station C, that the molding zone 108 narrows conically, viewed radially from the outside towards the inside.

At the free end 114, the embossing stamp 106 has a thicker region 116 and, further radially outwards, a thinner region 118 which, when the embossing stamp 106 is fully introduced into the second accommodating portion, comes to rest at the radial level of the transition zone 112. Due to the conically tapering configuration of the molding zone 108 with inclined molding surfaces 94, 96 and the sequence of the thicker region 116 and the thinner region 118 on the embossing stamp 106, the insulating strip portion 12 can be pressed through the gap-shaped opening 84, wherein the raised legs 30, 32 are able to protrude into the depression 120 created by the configuration of the thinner region 118, and can thus be transferred through the transition zone 112, then coming to rest on leg supporting surfaces 122 extending transversely to the adjacent molding surfaces 94, 96.

As is also apparent from FIG. 12, the first through fourth molds 54-57 each comprise a first mold part 124 and a second mold part 126, which can be moved relative to one another for another step of molding the insulating strip portion 12.

The relative movement may take place in different ways. In the exemplary embodiments shown, the mold parts 124, 126 can be pivoted relative to each other.

At the first through third stations A through C, the mold parts 124, 126 are located in a first position in which the accommodating portions 80, 82 have the above-described orientation and configuration.

For this purpose, the first mold part 124 is formed on a first holding sub-member 128, and the second mold part 126 is formed on a second holding sub-member 130. Moreover, a holding sub-member drive device 148 for driving a relative movement of the first and second holding sub-members 128, 130 is provided. Its effect and function will be illustrated in more detail below.

The shape obtained by the third insulating strip portion 12 at the third station C is shown in more detail in FIG. 5. Here, the correspondingly embossed back 102 and the first side wall 100 and the second side wall 104 can be seen. In this case, the side walls 100, 104 are still configured to be inclined relative to each other, so that a trapezoidal cross section is formed, wherein the back 102 forms a narrower side of the trapeze. At the broader sides, the insulating strip portion 12 is still open so that the embossing stamp 106 can be retracted again. This opening is delimited to the left and the right by the bent legs 30, 32, which here extend at an angle greater than 90 degrees relative to the respective side wall 100, 104.

The eighth step 8 then takes place at, or during the course of the movement towards, the fourth station D, according to which the fourth insulating strip portion 12 held at the fourth station D in the fourth holding member 41 is folded from the shape shown in FIG. 5 into the shape shown in FIG. 6. As is apparent from FIG. 12, the first holding sub-member 128 and the second holding sub-member 130 are moved relative to each other by the holding sub-member drive device 148, so that the first mold sub-member 124, which includes the first molding surface 94, and the second mold sub-member 126, which includes the third molding surface 96, are also moved relative to each other.

In the illustrated embodiment, the holding sub-members 128, 130 are pivoted relative to each other for this purpose. In other embodiment, other movements are also possible.

This own movement of the holding member 41 may be driven in various ways.

In an embodiment not shown in any detail, the holding sub-member drive device 148 has a separate drive unit or a separate actuator (not shown). That may be formed on the fourth station D, for example, and grasp the holding member 41 by means of a member that can be moved in a driven manner, in order to move the former. For example, two slides are provided which pivot the holding sub-members 128, 130 by insertion. In another embodiment, the holding sub-member drive device 148 has, at the transition to the fourth station D, a link guide (not shown), into which corresponding counter-members on the holding sub-members 128, 130 engage, so that the movement of the holding sub-members 128, 130 is initiated by the movement of the transport device 42 relative to the link guide.

Thus, the molding surfaces 94, 96 are aligned relative to each other at the fourth station D, or during the course of the movement towards the fourth station. For this purpose, the transition surfaces 110 may serve as stops.

Furthermore, the fourth station D includes the inserting device 140. The latter has a fourth slide, which is not shown in any more detail here and which, e.g., guided by guiding grooves 132, is axially pushed in the first molding surface 94 and the second molding surface 96 into the second accommodating portion 82 and axially pushed, as a whole, through the fourth holding member 41, in order to push the fully molded insulating strip portion 12 out of the fourth holding member 41 and through a discharge opening 134, which is indicated in FIG. 8, in a support plate 136 of the transport device 42, into the winding slot 14 of the stator 18, which is aligned therewith, as is shown in FIG. 7. Subsequent to the insertion, the stator 18 is turned by one groove with a stator holding and moving device, which is not shown in any more detail, until the next winding slot 14 is aligned with the discharge opening 134.

In the embodiments of the device 20 shown in FIGS. 8 to 12, the execution of the above-mentioned steps 4 to 9 is thus distributed amongst stations A-D, which are disposed in a rotary manner about a horizontal axis—axis of rotation 48—in a tool turret 46.

For this purpose, the steps 4 through 9 were distributed amongst a first through fourth cycle. Thus, the installation space requirements are also reduced. In the first cycle—at the first station A—the insulating material, which is configured as a paper, for example, is inserted into the tool turret 46 with legs 30, 32 that are already folded up—after the third step 3. The length of the future slot insulator 138—see FIG. 7—depends on how far the strip 10 of insulating material is inserted.

Furthermore, the strip 10 of insulating material is clamped in the first cycle, at the first station A, and the first slide 69 is inserted. Then, the insulation is cut off and the collar 70 is embossed at the same time. The first slide 69 moves out again.

Subsequently, the tool turret 46 rotates by 90 degrees towards the second cycle—at the second station B. Here, the collar 70 is turned back by the second slide 74 and the insulator strip portion 12 is pushed completely into the tool turret 46 by a third slide 76. Instead of the configuration with a second slide 74 and a third slide 76, their functions may also be carried out by a combined, common slide.

After a further 90-degree rotation towards the third cycle—third station C—the embossing stamp 106 moves in. In the process, the insulator strip portion 12 is pressed into an embossing mold—e.g., the third mold 56—and has its back 102 embossed. Prior to the next 90-degree rotation, the embossing stamp 106 moves out again. During this last rotation, two mold halves—the first holding sub-member 128 and the second holding sub-member 130—are snapped together by means of a linkage, and the insulator strip portion 12 is folded together—eighth step 8. Thus, the insulator strip portion 12 receives the final shape. In the fourth cycle—at the fourth station D—an ejector (fourth slide, not shown) presses the finished slot insulator 138 out of the tool turret 46 into the stator 18. After the ejector has moved back, the tool turret 46 is able to rotate into the first cycle again—the first station A. The process is repeated. At each cycle, a new strip 10 of insulating material is inserted at the first station A, so that four insulator strip portions 12 are simultaneously located in the tool turret 46 at any time. The stator 18 itself is rotated further by one slot after each insertion of a slot insulator 138.

The insulator strip portion 12 remains in the same mold portion—mold 54-57—over the entire duration of the process. A direct transport of the insulator strip portion 12 itself is thus avoided.

In the embodiment of FIGS. 8 to 12, the several holding members 38-41 are formed on a tool turret 46, so that a transport device 42 is formed by the tool turret 46 and its rotary drive unit 50. A circular circulating path 44 is thus formed, on whose circumference several stations A-D may be formed, so that several processing steps may be carried out in parallel and simultaneously.

However, the idea illustrated herein is not limited to an implementation as a tool turret 46. The corresponding several holding members 38-41 may also be moved from station to station on differently configured circulating paths 44, as is shown in FIG. 13. One conceivable arrangement would be as a chain or paternoster with a recirculation of the holding members 38-41 with corresponding molds 54-57. As a result, the stations A-D may also be arranged differently. In this case, however, at least two steps of the method, particularly the step of molding the insulating strip portion 12 and the step of inserting the molded insulating strip portion 12, are always carried out in parallel at different stations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

1 First step
2 Second step
3 Third step
4 Fourth step
5 Fifth step
6 Sixth step
7 Seventh step
8 Eight step
9 Ninth step
10 Strip (of insulating material)
12 Insulator strip portion
14 Winding slot
16 Component
18 Stator
20 Device
22 Stock reel
24 Bead roll
28 Deflector and smoothing roll
30 First leg
32 Second leg
34 Bead
36 Leg bending device
38 First holding member
39 Second holding member
40 Third holding member
41 Fourth holding member
42 Transport device
44 Circulating path
46 Tool turret
48 Axis of rotation
50 Rotary drive unit
52 Rotary shaft
54 First mold
55 Second mold
56 Third mold
57 Fourth mold
58 Supply device
60 Cutting device
61 Cutting blade
62 Cutting edge
63 Inclined portion
64 Gap
66 Inlet guide
68 Cutting block
69 First slider
70 Collar
72 Retaining stamp
74 Second slider
76 Third slider
80 First accommodating portion 82 Second accommodating portion
84 Gap-shaped opening
86 First lateral limiting member
87 Second lateral limiting member
88 Bottom surface
90 Undercut
92 Longitudinal opening
94 First molding surface
95 Second molding surface
96 Third molding surface
98 Molding device
100 First side wall
102 Back
104 Second side wall
106 Embossing stamp
108 Molding zone
110 Transition surface
112 Transition zone
114 Free end
116 Thicker region
118 Thinner region
120 Depression
122 Leg supporting surface
124 First mold part
126 Second mold part
128 First holding sub-member
130 Second holding sub-member
132 Guiding groove
134 Discharge opening
136 Support plate
138 Slot insulator
140 Inserting device
142 Collar embossing device
144 Collar turning device
146 Positioning device
148 Holding member drive device
A First station
B Second station
BS Width of strip
C Third station
D Fourth station

The invention claimed is:

1. A method for producing slot insulators for winding slots of a component of an electrical machine, method comprising steps of:
   a) supplying a strip of insulating material,
   c) cutting off one or several insulator strip portions from the strip,
   d) molding the cut insulator strip portion for one of the winding slots to a shape of the winding slot in a respective one of several molds, and
   e) inserting the molded insulator strip portion into a different winding slot,
   wherein at least the steps d) and e) are carried out simultaneously for at least two insulator strip portions to be inserted into different winding slots such that step d) is carried out for a second insulator strip portion in another one of the several molds, while step e) is carried out for a previously molded first insulator strip portion simultaneously.

2. The method according to claim 1, wherein the steps c), d) and e) are carried out simultaneously for at least three insulator strip portions to be respectively inserted into three different winding slots.

3. The method according to claim 1, further comprising the steps of:
   guiding the molds on a circulating path containing at least one pick-up station for picking up the insulator strip portion and a delivery station for inserting the molded insulator strip portion into the winding slot.

4. The method according to claim 3, further including using at least one first, one second and one third mold, which are moved in a cyclical manner on the circulating path at least from the pick-up station to a molding station, from the molding station to the delivery station, and from the delivery station to the pick-up station.

5. The method according to claim 4, including using a fourth mold, wherein the first through fourth molds are moved in a cyclical manner between the stations on the circulating path, wherein the stations additionally comprise a positioning station between the pick-up station and the molding station.

6. The method according to claim 3, wherein at least one of
   f) the cutting-off step takes place at the pick-up station, or
   g) the molds comprise a first and a second mold part, and wherein the first and the second mold part, in order to change the shape of the insulator strip portion, are moved relative to each other while being moved to at least one or at at least one of the stations on the circulating path.

7. The method according to claim 1,
wherein the production takes place in processing cycles,
wherein two, three, four or more processing cycles are carried out simultaneously,
wherein the processing cycles are selected from a group of processing cycles including:
   molding at least one longitudinal edge or several longitudinal edges of the strip or the insulator strip portion;
   at least one of
      cutting off the insulator strip portion,
      turning back a collar on at least one of a front edge of the strip, or on a rear edge of the insulator strip portion;
   positioning the insulator strip portion in the mold;
   embossing the insulator strip portion by means of an embossing stamp in the mold in order to mold the slot insulator, and
   pushing the molded insulator strip portion from the mold into the winding slot in order to insert the molded insulator strip portion into the winding slot.

8. The method according to claim 1, wherein at least one of:
   h) the method further includes the step:
      b) molding at least one longitudinal edge region of the strip or the insulator strip portion, or
   i) step c) includes: selecting an insulator strip portion length, which extends in a moving direction of the strip, of the insulator strip portion to be cut off, depending on an axial length of the winding slot; and
      step e) includes: inserting the molded insulator strip portion in an inserting direction extending in the direction of the insulator strip portion length.

9. The method according to claim 1, wherein the second insulator strip is molded in a first mold, and the previously molded first insulator strip portion is molded in a second mold different from the first mold.

* * * * *